United States Patent
Li

(10) Patent No.: US 11,389,040 B2
(45) Date of Patent: Jul. 19, 2022

(54) CLEANING MODE CONTROL METHOD AND CLEANING ROBOT

(71) Applicant: Yunjing Intelligence Technology (Dongguan) Co., Ltd., Dongguan (CN)

(72) Inventor: Chang Li, Dongguan (CN)

(73) Assignee: Yunjing Intelligence Technology (Dongguan) Co., Ltd., Dongguan (CN)

( * ) Notice: Subject to any disclaimer, the term of this patent is extended or adjusted under 35 U.S.C. 154(b) by 0 days.

(21) Appl. No.: 17/355,584

(22) Filed: Jun. 23, 2021

(65) Prior Publication Data

US 2021/0315430 A1 Oct. 14, 2021

Related U.S. Application Data

(63) Continuation of application No. PCT/CN2019/114036, filed on Oct. 29, 2019.

(30) Foreign Application Priority Data

Jan. 8, 2019 (CN) .......................... 201910015591.2

(51) Int. Cl.
*G05B 19/04* (2006.01)
*G05B 19/18* (2006.01)
(Continued)

(52) U.S. Cl.
CPC ............ *A47L 9/2805* (2013.01); *A47L 9/1409* (2013.01); *A47L 11/24* (2013.01); *A47L 11/28* (2013.01);
(Continued)

(58) Field of Classification Search
CPC .... G05D 1/021; G05D 1/0219; G05D 1/0225; G05D 2201/0203; G01S 17/00;
(Continued)

(56) References Cited

U.S. PATENT DOCUMENTS 8,584,313 B2* 11/2013 Kim ........................ A47L 9/108
15/347
2016/0100733 A1* 4/2016 Kim ...................... A47L 9/2805
15/319
(Continued)

FOREIGN PATENT DOCUMENTS

CN 104172993 A 12/2014
CN 105982611 A 10/2016
(Continued)

OTHER PUBLICATIONS

First Office Action issued in counterpart Chinese Patent Application No. 201910015591.2, dated Jan. 2, 2020.
International Search Report and Written Opinion issued in corresponding PCT Application No. PCT/CN2019/114036, dated Jan. 23, 2020.
(Continued)

*Primary Examiner* — Harry Y Oh
(74) *Attorney, Agent, or Firm* — Westbridge IP LLC

(57) ABSTRACT

A cleaning mode control method and a cleaning robot are configured to automatically control the cleaning robot to perform a cleaning mode corresponding to a cleaning module. The method includes: detecting whether a cleaning module is installed on the robot body; on condition of detecting the cleaning module is installed on the robot body, controlling the cleaning robot to perform a cleaning mode used in conjunction with the cleaning module; the cleaning module is a component for cleaning a ground, and the cleaning mode is a working mode of the cleaning robot. Thus, the cleaning robot is automatically controlled to perform the cleaning mode corresponding to the cleaning module, so that the work of the cleaning robot is intelligent.

15 Claims, 8 Drawing Sheets

(51) Int. Cl.
    *A47L 9/28*     (2006.01)
    *A47L 9/14*     (2006.01)
    *A47L 11/24*     (2006.01)
    *A47L 11/28*     (2006.01)
    *A47L 11/40*     (2006.01)
    *G05D 1/02*     (2020.01)

(52) U.S. Cl.
    CPC ....... *A47L 11/4002* (2013.01); *A47L 11/4036* (2013.01); *G05D 1/0219* (2013.01); *G05D 1/0225* (2013.01); *A47L 2201/06* (2013.01); *G05D 2201/0203* (2013.01)

(58) Field of Classification Search
    CPC ........ A47L 11/24; A47L 11/28; A47L 11/282; A47L 11/4002; A47L 11/4011; A47L 11/4013; A47L 11/4036; A47L 2201/04; A47L 2201/06; A47L 9/1409; A47L 9/2805
    See application file for complete search history.

(56) References Cited

U.S. PATENT DOCUMENTS

| | | | |
|---|---|---|---|
| 2016/0227975 A1* | 8/2016 | Ebrahimi Afrouzi | ....................... A47L 11/4066 |
| 2018/0184870 A1* | 7/2018 | Moon | ................... A47L 11/282 |
| 2018/0184874 A1* | 7/2018 | Song | .......................... A47L 9/30 |
| 2020/0077858 A1* | 3/2020 | Zhang | ................. A47L 11/4044 |
| 2021/0127928 A1* | 5/2021 | Kang | ....................... A47L 9/28 |

FOREIGN PATENT DOCUMENTS

| | | |
|---|---|---|
| CN | 206659755 U | 11/2017 |
| CN | 207640330 U | 7/2018 |
| CN | 207755209 U | 8/2018 |
| CN | 208176530 U | 12/2018 |
| CN | 109589050 A | 4/2019 |
| EP | 2815687 A1 | 12/2014 |

OTHER PUBLICATIONS

Second Office Action issued in counterpart Chinese Patent Application No. 201910015591.2, dated Jun. 19, 2020.

\* cited by examiner

CLEANING MODE CONTROL METHOD AND CLEANING ROBOT

CROSS REFERENCE TO RELATED APPLICATIONS

This application is a Continuation Application of International Application No. PCT/CN2019/114036, filed on Oct. 29, 2019, which claims the priority of Chinese Patent Application No. 201910015591.2, entitled "CLEANING MODE CONTROL METHOD AND CLEANING ROBOT", filed on Jan. 8, 2019. The disclosures of the aforementioned applications are hereby incorporated by reference in their entireties.

TECHNICAL FIELD

This application relates to the field of smart home devices, and in particular, to a cleaning mode control method and a cleaning robot.

BACKGROUND

A cleaning robot is configured to clean a ground. A bottom of the cleaning robot is provided with a cleaning module and a driving wheel. When driven by the driving wheel, the cleaning robot can move on the ground. The cleaning robot can clean the ground through the cleaning module.

The existing cleaning robot is mostly a sweeping robot. The bottom of the sweeping robot is provided with a sweeping brush and a dust suction port. The ground is cleaned by the sweeping brush and garbage on the ground is sucked through the dust suction port. Alternatively, the cleaning robot is a mopping robot, and the mopping robot is pasted with a mop on a bottom and mops the ground through the mop.

The existing cleaning robot is either a sweeping robot or a mopping robot with a single function. Therefore, the cleaning robot does not need to identify the cleaning module. When the cleaning robot needs to work, for example, when the user triggers a power button of the cleaning robot, the cleaning robot directly performs a preset cleaning mode. However, this is not applicable to the cleaning robot that can replace the cleaning module.

SUMMARY

Some embodiments of the present application provide a cleaning mode control method and a cleaning robot, configured to automatically control the cleaning robot to perform a cleaning mode corresponding to a cleaning module, so that the work of the cleaning robot is intelligent.

In order to solve the above technical problem, an embodiment of the present application provides a cleaning mode control method, the method is applied to a cleaning robot including a robot body. The method includes: detecting whether a cleaning module is installed on the robot body; on condition of detecting the cleaning module is installed on the robot body, controlling the cleaning robot to perform a cleaning mode used in conjunction with the cleaning module; the cleaning module is a component for cleaning a ground, and the cleaning mode is a working mode of the cleaning robot.

In order to solve the above technical problem, an embodiment of the present application further provides a cleaning robot including a robot body; the cleaning robot includes: a detector configured for detecting whether a cleaning module is installed on the robot body; and a controller configured for on condition of detecting the cleaning module is installed on the robot body, controlling the cleaning robot to perform a cleaning mode used in conjunction with the cleaning module; the cleaning module is a component for cleaning a ground, and the cleaning mode is a working mode of the cleaning robot.

As can be seen from the above technical solutions, the embodiments of this application have the advantages as follows.

Detecting whether the cleaning module is installed on the robot body on the cleaning robot including the robot body. On condition of detecting the cleaning module is installed on the robot body, controlling the cleaning robot to perform a cleaning mode used in conjunction with the cleaning module. The cleaning module is a component for cleaning a ground, and the cleaning mode is a working mode of the cleaning robot. In this way, when it is detected that the cleaning module is installed on the robot body, the cleaning mode performed by the cleaning robot is a cleaning mode used in conjunction with the cleaning module. Thus, the cleaning robot is automatically controlled to perform the cleaning mode corresponding to the cleaning module, so that the work of the cleaning robot is intelligent.

DETAILED DESCRIPTION OF THE EMBODIMENTS

Some embodiments of the present application provide a cleaning mode control method and a cleaning robot, configured to automatically control the cleaning robot to perform a cleaning mode corresponding to a cleaning module, so that the work of the cleaning robot is intelligent.

The embodiments of this application provide a cleaning robot 100 which can be used to automatically clean a ground. The application scenarios of the cleaning robot 100 may be home indoor cleaning, large-scale site cleaning, and the like.

Figure 1:
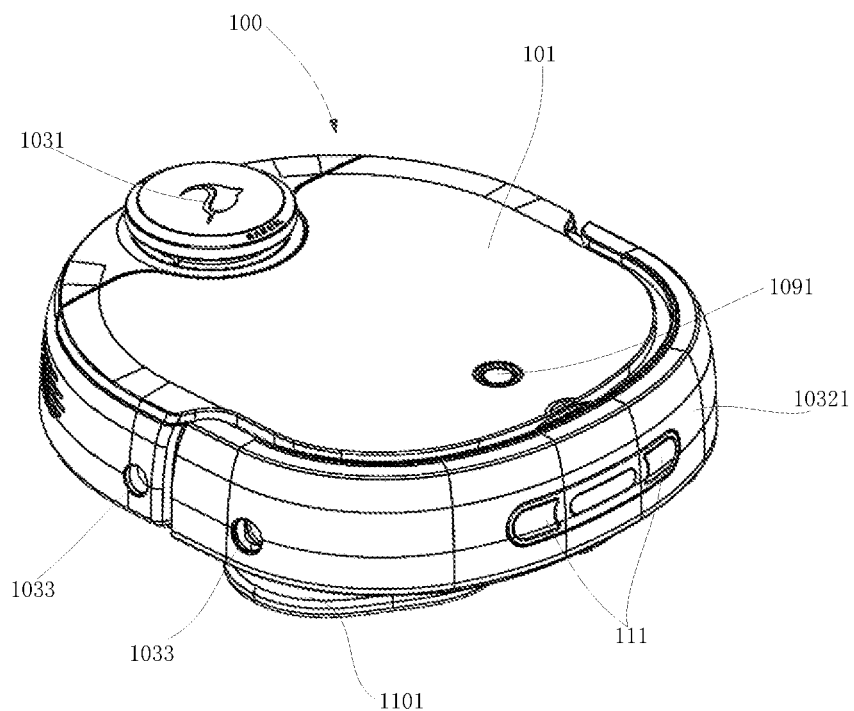
FIG. 1 is a perspective diagram of a cleaning robot according to an embodiment of this application.
Figure 2:
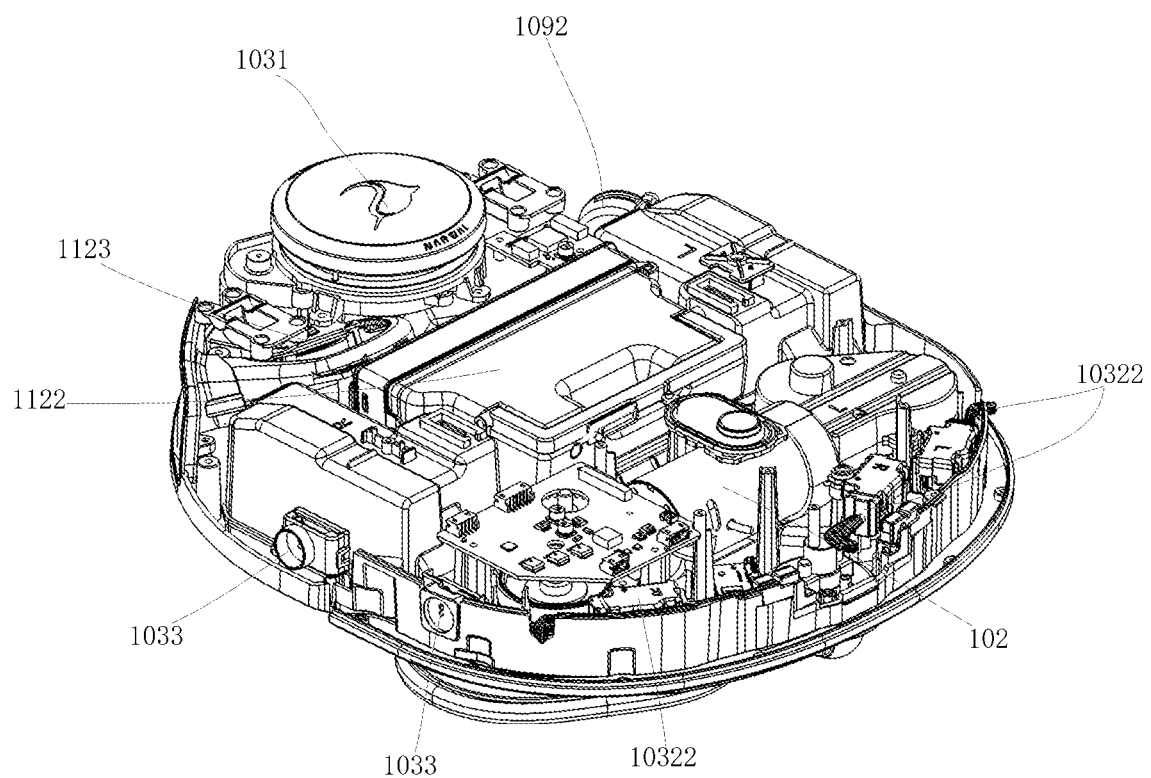
FIG. 2 is a schematic structural diagram of the cleaning robot shown in FIG. 1 with a part of a housing being removed.
Figure 3:
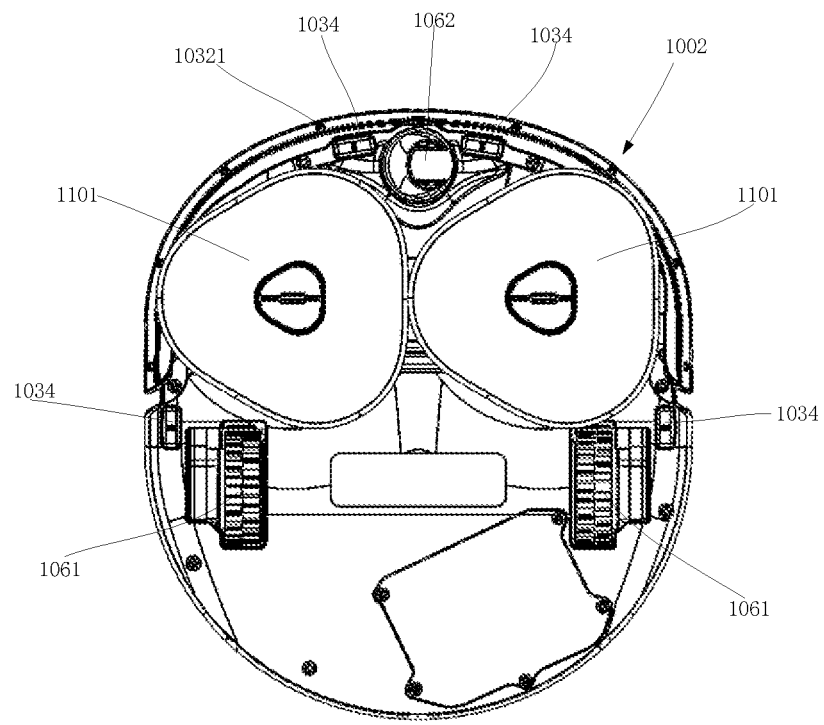
FIG. 3 is a bottom view of a mopping robot according to an embodiment of this application.
Figure 4:
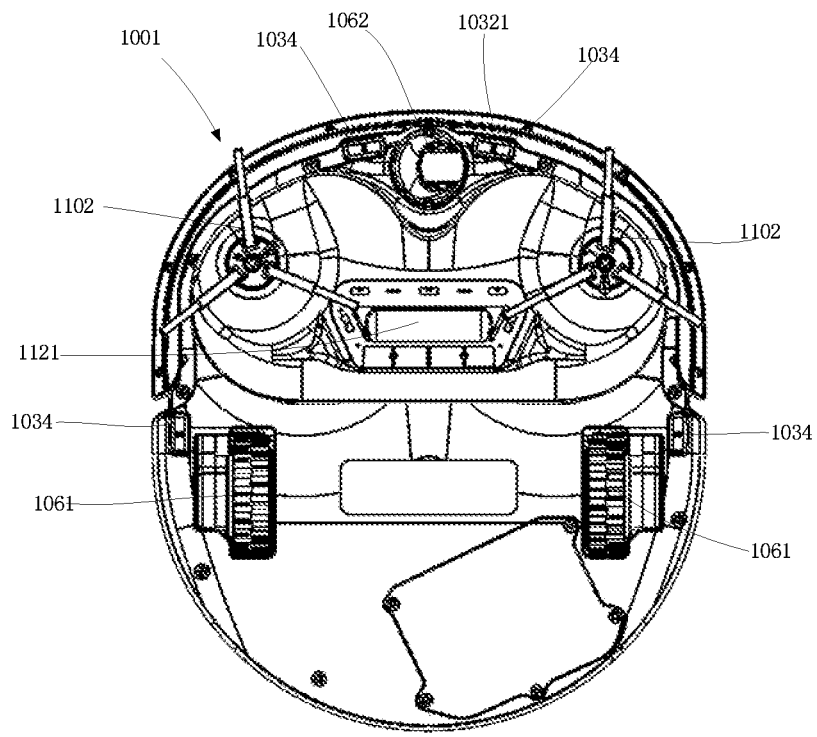
FIG. 4 is a bottom view of a sweeping robot according to an embodiment of this application.
Figure 5:
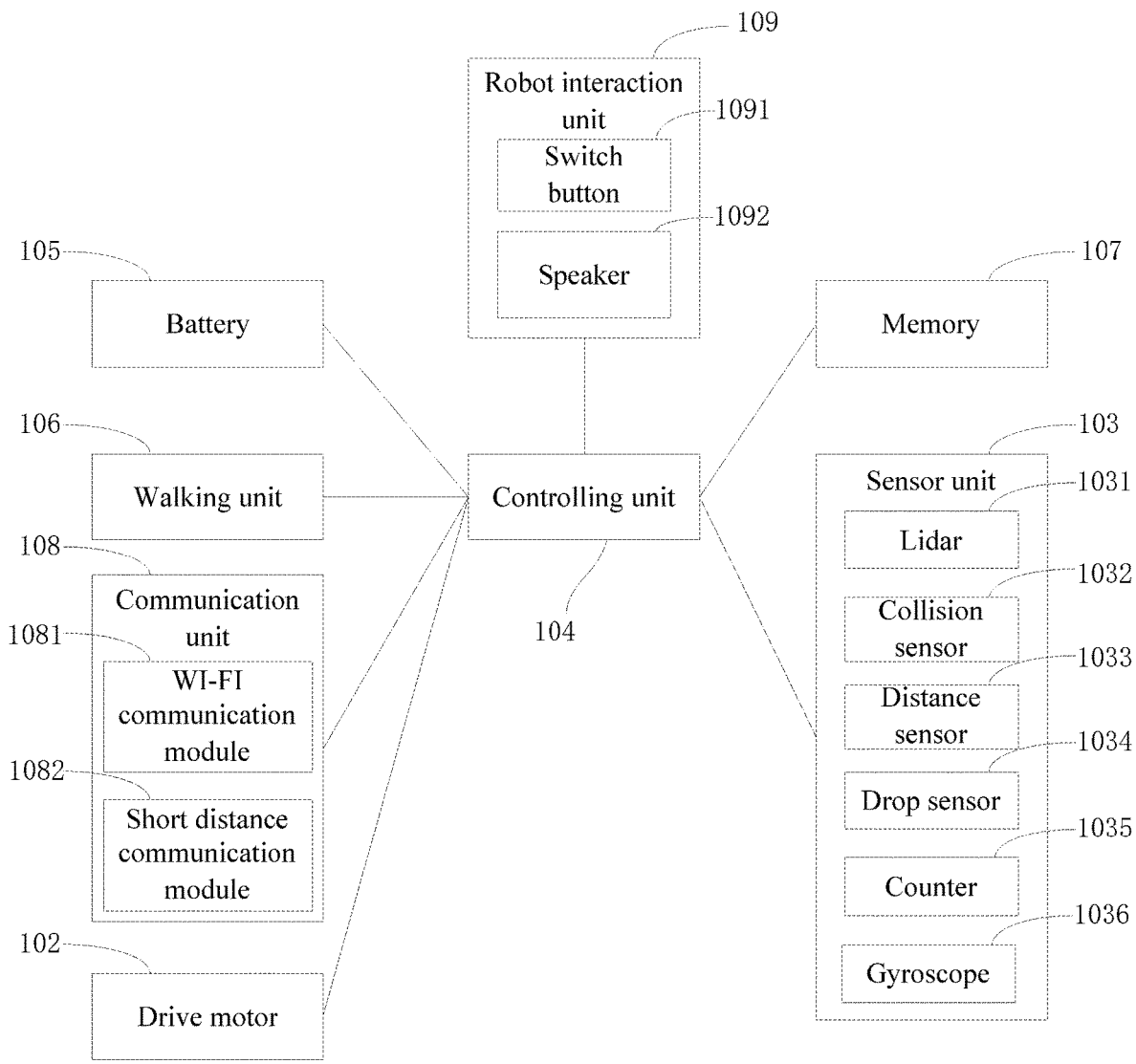
FIG. 5 is another structural diagram of the cleaning robot shown in FIG. 1.

FIG. 1 is a perspective schematic diagram of a cleaning robot according to an embodiment of this application. FIG. 2 is a schematic structural diagram of the cleaning robot in FIG. 1 with a part of a housing being removed. FIG. 3 is a bottom view of a mopping robot according to an embodiment of this application. FIG. 4 is a bottom view of a sweeping robot according to an embodiment of this application. FIG. 5 is another structural diagram of the cleaning robot shown in FIG. 1.

Types of the cleaning robot 100 include a sweeping robot 1001 and a mopping robot 1002, etc. As shown in FIGS. 1 to 5, the cleaning robot 100 includes a robot body 101, a driving motor 102, a sensor unit 103, a controlling unit 104, a battery 105, a walking unit 106, a memory 107, a communication unit 108, a robot interaction unit 109, a cleaning component, a charging component 111 and so on.

The robot body 101 may have a circular structure, a square structure, or the like. In the embodiments of this application, the robot body 101 having a D-shaped structure is taken as an example for description. As shown in FIG. 1, a front part of the robot body 101 is a rectangular structure with rounded corners, and a rear part is a semicircular structure. In the embodiments of this application, the robot body 101 has a left-right symmetric structure.

The cleaning component is configured to clean the ground, and a number of cleaning component may be one or more. The cleaning component is arranged at a bottom of the robot body 101, specifically at a front position of the bottom of the robot body 101. A driving motor 102 is provided inside the robot body 101, two rotating shafts extend from the bottom of the robot body 101, and the cleaning component is sleeved on the rotating shafts. The driving motor 102 can drive the rotating shafts to rotate, so that the rotating shafts drive the cleaning component to rotate.

As shown in FIG. 3, for the mopping robot 1002, the cleaning component is specifically a mopping component 1101, and the mopping component 1101 is, for example, a mop. The mopping component 1101 is configured for mopping the ground.

As shown in FIG. 4, for the cleaning robot 1001, the cleaning component is specifically a side brush 1102, and the side brush 1102 is configured for sweeping the ground. The cleaning robot 1001 is further provided with a dust suction device, which includes a dust suction port 1121 provided at the bottom of the robot body 101 and a dust box 1122 and a fan 1123 provided inside the robot body 101. The side brush 1102 is arranged on the rotating shaft at the bottom of the sweeping robot 1001. After the rotating shaft drives the side brush 1102, the rotating side brush 1102 sweeps garbage such as dust to the vicinity of the dust suction port 1121 at the bottom of the sweeping robot 1001. Due to the suction effect of the fan 1123, the garbage is sucked into the dust suction port 1121 and enters the dust box 1122 through the dust suction port 1121 for temporary storage.

In the embodiments of this application, the cleaning component of the cleaning robot 100 may be set in a detachable connection mode. When mopping cleaning is required, the mopping component 1101 is installed on the bottom of the robot body 101; and when sweeping cleaning is required, the side brush 1102 is configured to replace the mopping component 1101, and the side brush 1102 is installed on the bottom of the robot body 101.

The walking unit 106 is a component related to the movement of the cleaning robot 100, and the walking unit 106 includes a driving wheel 1061 and a universal wheel 1062. The universal wheel 1062 and the driving wheel 1061 cooperate to realize steering and movement of the cleaning robot 100. A driving wheel 1061 is provided on left and right sides at a position near the rear part of a bottom surface of the robot body 101 respectively. The universal wheel 1062 is arranged on a center line of the bottom surface of the robot body 101 and is located between the two cleaning components. Each driving wheel 1061 is provided with a driving wheel motor and rotates when driven by the driving wheel motor. The driving wheel 1061 rotates to drive the cleaning robot 100 to move. By controlling a difference in rotation speed of left and right driving wheels 1061, a steering angle of the cleaning robot 100 can be controlled.

The controlling unit 104 is provided inside the robot body 101, and the controlling unit 104 is configured to control the cleaning robot 100 to perform specific operations. The controlling unit 104 may be, for example, a Central Processing Unit (CPU), or a microprocessor. As shown in FIG. 5, the controlling unit 104 is electrically connected with components such as the battery 105, the memory 107, the driving motor 102, the walking unit 106, the sensor unit 103, and the robot interaction unit 109 to control these components. The battery 105 is provided inside the robot body 101, and the battery 105 is configured to provide power to the cleaning robot 100.

The robot body 101 is further provided with a charging component 111, which is configured to obtain power from an external device of the cleaning robot 100 to charge the battery 105.

The memory 107 is arranged on the robot body 101, and a program is stored on the memory 107, and the program is executed by the controlling unit 104 to realize corresponding operations. The memory 107 is further configured to store parameters used by the cleaning robot 100. The memory 107 includes, but is not limited to, a magnetic disk memory, a Compact Disc Read-Only Memory (CD-ROM), an optical memory, and the like.

The communication unit 108 is arranged on the robot body 101. The communication unit 108 is configured to allow the cleaning robot 100 to communicate with external devices. The communication unit 108 includes but is not limited to a Wireless Fidelity (WI-FI) communication module 1081 and a short distance communication module 1082 and so on. The cleaning robot 100 can be connected to a WI-FI router through the WI-FI communication module 1081 to communicate with a terminal. The cleaning robot 100 communicates with the base station through a short-range communication module 1082. The base station is a cleaning device that cooperates with the cleaning robot 100.

The sensor unit 103 provided on the robot body 101 includes various types of sensors, such as a lidar 1031, a collision sensor 1032, a distance sensor 1033, a drop sensor 1034, a counter 1035, and a gyroscope 1036.

The lidar 1031 is set on a top of the robot body 101. When working, the lidar 1031 rotates and emits a laser signal through a transmitter on the lidar 1031. The laser signal is reflected by the obstacle, so that a receiver of the lidar 1031 receives the laser signal reflected by the obstacle. A circuit unit of the lidar 1031 can obtain surrounding environment information by analyzing the received laser signal, such as a distance and an angle of the obstacle relative to the lidar

1031. In addition, a camera may also be configured instead of lidar, and the distance and angle of the obstacle relative to the camera can also be obtained by analyzing the obstacle in an image taken by the camera.

The collision sensor 1032 includes a collision housing 10321 and a trigger sensor 10322. The collision housing 10321 surrounds a head of the robot body 101. Specifically, the collision housing 10321 is provided at the head of the robot body 101 and front positions of left and right sides of the robot body 101. The trigger sensor 10322 is arranged inside the robot body 101 and behind the collision housing 10321. An elastic buffer is provided between the collision housing 10321 and the robot body 101. When the cleaning robot 100 collides with an obstacle through the collision housing 10321, the collision housing 10321 moves towards the inside of the cleaning robot 100 and compresses the elastic buffer. After the collision housing 10321 moves a certain distance towards the inside of the cleaning robot 100, the collision housing 10321 contacts the trigger sensor 10322, and the trigger sensor 10322 is triggered to generate a signal, which can be sent to the controlling unit 104 inside the robot body 101 for processing. After colliding the obstacle, the cleaning robot 100 moves away from the obstacle, and the collision housing 10321 moves back to the original position under the action of the elastic buffer. It can be seen that the collision sensor 1032 can detect the obstacle and play a buffering role when it collides with the obstacle.

The distance sensor 1033 may specifically be an infrared detection sensor, which may be configured to detect a distance from the obstacle to the distance sensor 1033. The distance sensor 1033 is arranged on a lateral side of the robot body 101, so that a distance from the obstacle located near the lateral side of the cleaning robot 100 to the distance sensor 1033 can be measured by the distance sensor 1033. The distance sensor 1033 may also be an ultrasonic distance measuring sensor, a laser distance measuring sensor or a depth sensor.

The drop sensor 1034 is provided on a bottom edge of the robot body 101, and a number can be one or more. When the cleaning robot 100 moves to an edge of the ground, the drop sensor 1034 can detect that the cleaning robot 100 is at risk of falling from a height, so as to perform a corresponding anti-drop response, for example, the cleaning robot 100 stops moving or moves away from the falling position and so on.

A counter 1035 and a gyroscope 1036 are further provided inside the robot body 101. The counter 1035 is configured to accumulate a total rotation angle of the driving wheel 1061 to calculate a distance the driving wheel 1061 drives the cleaning robot 100 to move. The gyroscope 1036 is configured to detect the rotation angle of the cleaning robot 100, so that an orientation of the cleaning robot 100 can be determined.

The robot interaction unit 109 is disposed on the robot body 101, and the user can interact with the cleaning robot 100 through the robot interaction unit 109. The robot interaction unit 109 includes components such as a switch button 1091 and a speaker 1092. The user can control the cleaning robot 100 to start or stop working by pressing the switch button 1091. The cleaning robot 100 may play a prompt sound to the user through the speaker 1092.

It should be understood that the cleaning robot 100 described in the embodiments of this application is only a specific example, and does not specifically limit the cleaning robot 100 in the embodiments of this application. The cleaning robot 100 in the embodiments of this application may also be other specific implementations. For example, in other implementations, the cleaning robot may have more or fewer components than the cleaning robot 100 shown in FIG. 1.

Figure 6:
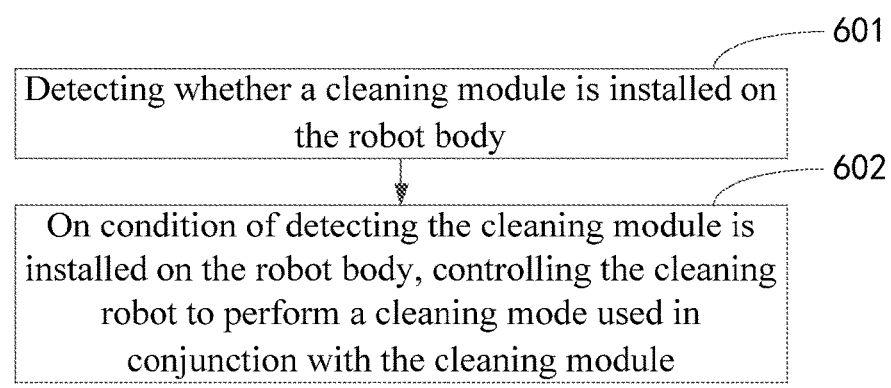
FIG. 6 is a flow chart of a cleaning mode control method according to an embodiment of this application.

The cleaning mode control method is applied to a cleaning robot including a robot body. Referring to FIG. 6, the cleaning mode control method according to an embodiment of this application includes:

Step 601: detecting whether a cleaning module is installed on the robot body. The cleaning module is a component for cleaning a ground. The cleaning module is, for example, a sweeping module for sweeping the ground, or a mopping module for mopping the ground. The cleaning robot includes a robot body, and the cleaning robot can detect whether the cleaning module is installed on the robot body.

Specifically, when the cleaning module is installed on the robot body, a sensor on the robot body is triggered to generate a preset electrical signal, and it is determined that the cleaning module is installed on the robot body by detecting the preset electrical signal. Here are a few examples:

Example 1: A magnetic member is provided on the cleaning module, and a Hall sensor is provided on the robot body. When the cleaning module is installed on the robot body, the Hall sensor on the robot body senses a magnetic field of the magnetic member on the cleaning module, so that the Hall sensor changes from high level to low level, by detecting the low level signal, the cleaning robot can determine that a cleaning module is installed on the robot body.

Example 2: A bump is provided on the cleaning module, and a displacement sensor is provided on the robot body. When the cleaning module is installed on the robot body, the bump on the cleaning module triggers the displacement sensor on the robot body to generate displacement, so that the displacement sensor generates a preset electrical signal, by detecting the preset electrical signal, the cleaning robot can determine that the cleaning module is installed on the robot body.

Example 3: A distance sensor is provided at a preset position of the robot body. When the cleaning module is installed on the robot body, the distance sensor at the preset position of the robot body detects a change in a distance value, thereby generating a preset electrical signal, by detecting the preset electrical signal, the cleaning robot can determine that a cleaning module is installed on the robot body.

Certainly, the sensor on the robot body configured to detect whether the cleaning module is installed can also be a photosensitive sensor, an image sensor, a voltage sensor, etc., which is not specifically limited in the embodiments of the present application.

Step 602: on condition of detecting the cleaning module is installed on the robot body, controlling the cleaning robot to perform a cleaning mode used in conjunction with the cleaning module. The cleaning mode is a working mode of the cleaning robot, such as a sweeping working mode, or a mopping working mode, or a sweeping and mopping parallel working mode.

On condition of detecting the cleaning module is installed on the robot body, controlling the cleaning robot to perform a cleaning mode used in conjunction with the cleaning module. By detecting the cleaning module installed on the robot body, the cleaning mode used in conjunction with the cleaning module can be determined for the cleaning robot to perform. Therefore, the control of the working mode of the cleaning robot is realized according to the detection of installation of the cleaning module, so that the intelligent selection of the working mode of the cleaning robot is realized.

In the embodiments of the present application, when the cleaning robot can use different cleaning modes, the cleaning mode to be performed can be determined based on the recognition of the cleaning module. At this time, the Step 601 of detecting whether a cleaning module is installed on the robot body includes determination of a type of the cleaning module, for example, the cleaning robot is triggered to perform different cleaning modes according to whether a signal generated by the cleaning module is detected at different positions on the robot body. Or, the cleaning robot is triggered to perform different cleaning modes according to different types of signals generated by the detected cleaning mode. Or, the cleaning robot is triggered to perform different cleaning modes according to different sensors that detect the signal.

There are many implementation manners of the cleaning module and the cleaning mode, and two of them are listed below:

Implementation manner 1: the cleaning module is a sweeping module, and the sweeping module is configured for sweeping the ground. Accordingly, the cleaning mode is a sweeping working mode.

There are many situations in the sweeping working mode. For example, the sweeping working mode includes detecting whether a dust box is installed on the robot body, and/or turning on a fan on the robot body. The dust box is configured for receiving garbage sucked by the cleaning robot from the ground, and the fan is configured for providing negative pressure to the robot body to suck the garbage from the ground.

Figure 8:
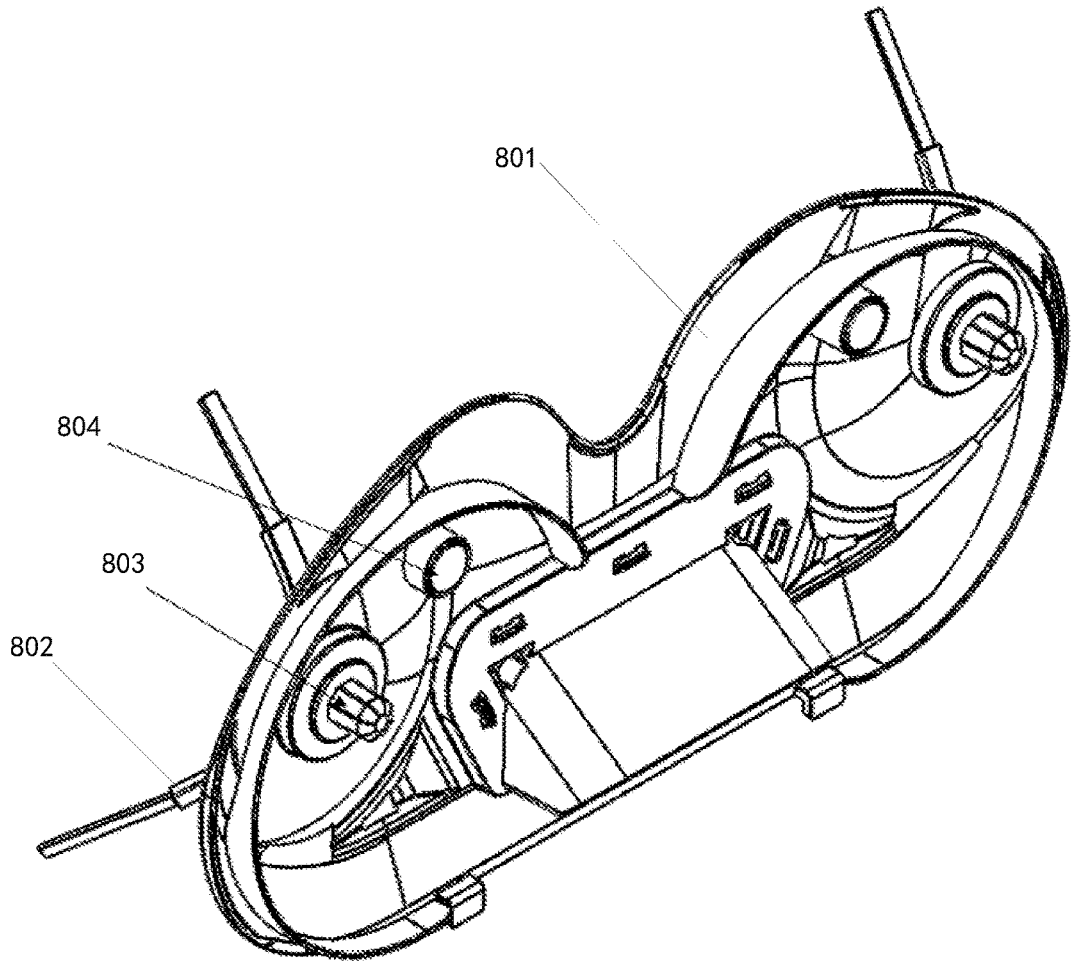
FIG. 8 is a schematic structural diagram of a sweeping module according to an embodiment of this application.

There are also many specific forms of the sweeping module. In one example, as shown in FIG. 8, the sweeping module includes a module body 801 and side brushes 802, the side brushes 802 are connected to the module body 801, and the side brushes 801 are rotatable relative to the module body 801. The sweeping module is detachably connected to the robot body through the module body 801. When the sweeping module is installed on the robot body, an output shaft of the robot body and the side brush are coaxially linked, for example, the side brush 802 and the side brush shaft 803 are fixedly connected, the output shaft of the robot body and the side brush shaft 803 are engaged or drivingly coupled, so that the output shaft drives the side brush shaft 803 to rotate to drive the side brush 802 to rotate. The sweeping module may include one or more side brushes, and in the example shown in FIG. 8, two sets of side brushes and side brush shafts are provided on left and right sides of the module body.

Figure 9:
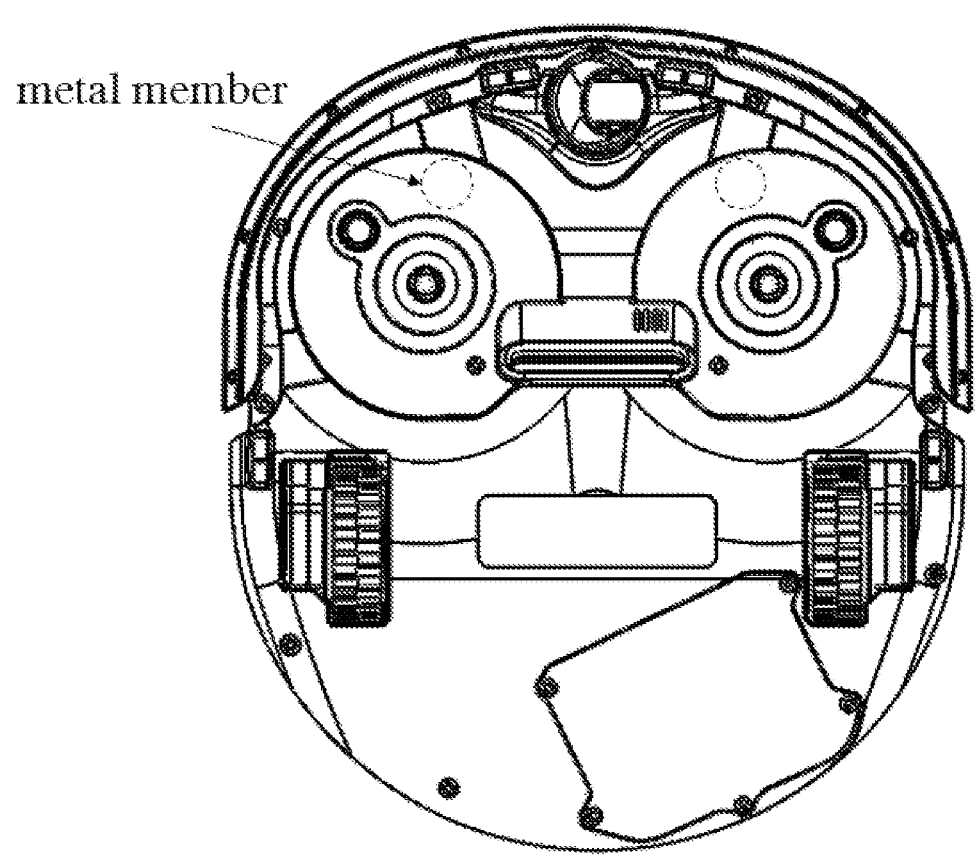
FIG. 9 is a schematic structural diagram of a robot body according to an embodiment of this application.
Figure 10:
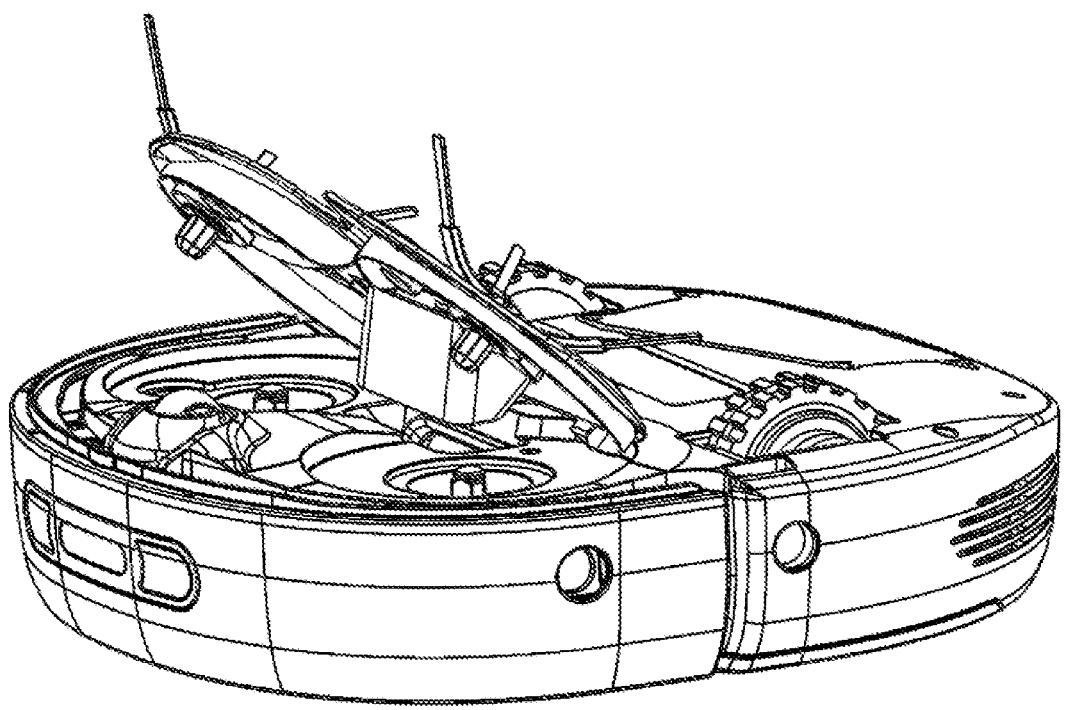
FIG. 10 is a schematic process diagram of installing the sweeping module on the robot body according to an embodiment of this application.
Figure 11:
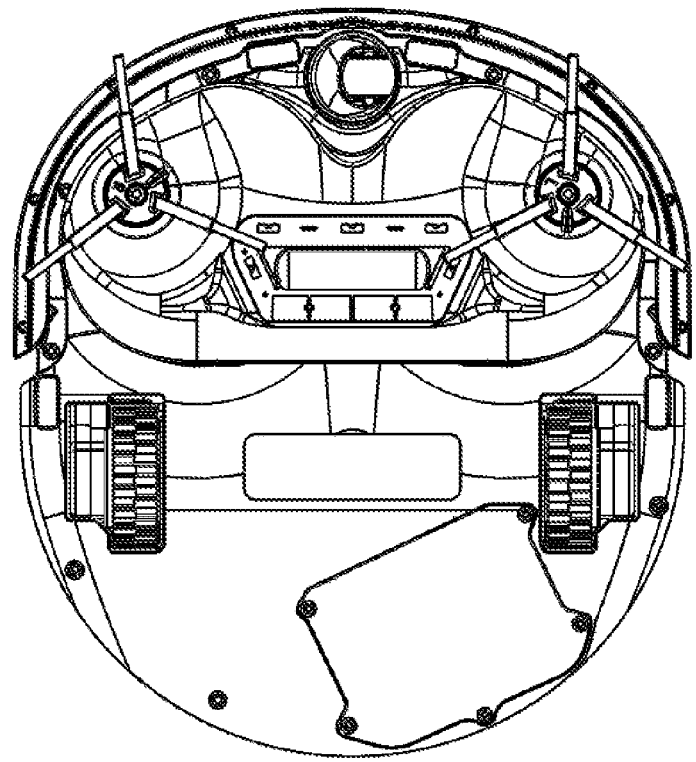
FIG. 11 is a bottom view of the robot body after installing the sweeping module according to an embodiment of this application.

The cleaning robot can detect the sweeping module in various ways. For example, as shown in FIG. 8, the module body is provided with a magnetic member 804, and positions of the magnetic member 804 and the side brush shaft 803 may be spaced apart by a preset distance. At this time, the step of detecting the cleaning module is installed on the robot body specifically includes: detecting a magnetic signal generated by the magnetic member of the module body at a first position of the robot body. For example, as shown in FIG. 9, a metal member is provided on the robot body. The metal member may be provided inside or on a surface of the robot body. As shown in FIG. 10, the sweeping module is installed on the robot body, and the installation result is shown in FIG. 11. At this time, when the module body of the sweeping module is connected to the robot body, the magnetic member on the sweeping module are magnetically connected to the metal member on the robot body. At this time, the metal member on the robot body is magnetically permeable, that is, the metal member generates a magnetic field because of the magnetic member on the sweeping module. A first Hall sensor is provided on the robot body. After the first Hall sensor detects the magnetic field on the metal member, it generates a preset electrical signal, for example, from high level to low level. The cleaning robot determines that the sweeping module is installed on the robot body when detecting the preset electrical signal generated by the first Hall sensor, so that the cleaning robot performs the sweeping working mode, for example, it detects whether the dust box is installed on the robot body, and if so, turns on the fan on the robot body.

Implementation manner 2: the cleaning module is a mopping module, and the mopping module is configured for mopping the ground. Accordingly, the cleaning mode is a mopping working mode.

There are many situations in the mopping working mode. For example, the mopping working mode includes controlling the cleaning robot to move toward a base station to clean the mopping module on the base station.

Figure 12:
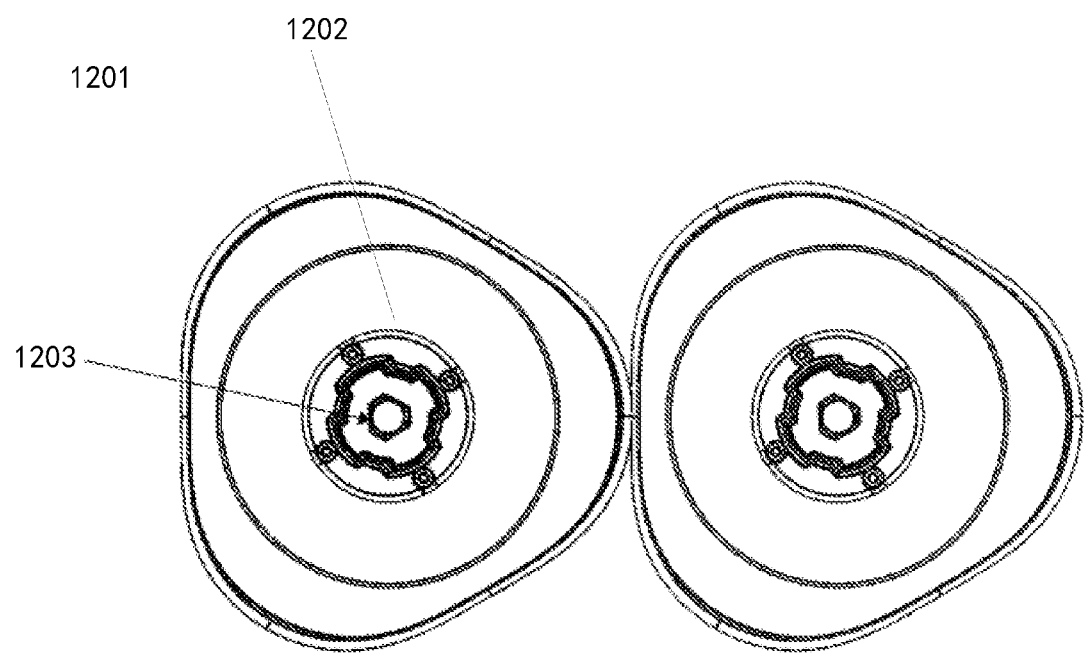
FIG. 12 is a schematic structural diagram of a mopping module according to an embodiment of this application.

There are many specific forms of the mopping module. In a specific example, as shown in FIG. 12, the mopping module includes a mopper 1201 and a turntable 1202 connected to each other, the mopper 1201 is configured for mopping the ground, and the mopper 1201 is, for example, a mop. The mopping module is detachably connected to the robot body through the turntable 1202. When the mopping module is installed on the robot body, the output shaft on the robot body and the turntable 1202 are coaxially linked. For example, the output shaft of the robot body and the turntable 1202 are engaged or drivingly coupled, so that the output shaft drives the turntable 1202 to rotate to drive the mopper 1201 to rotate. The mopping module may include one or more moppers 1201 and turntables 1202. In the example shown in FIG. 12, the mopping module includes two sets of moppers 1201 and turntables 1202.

Figure 13:
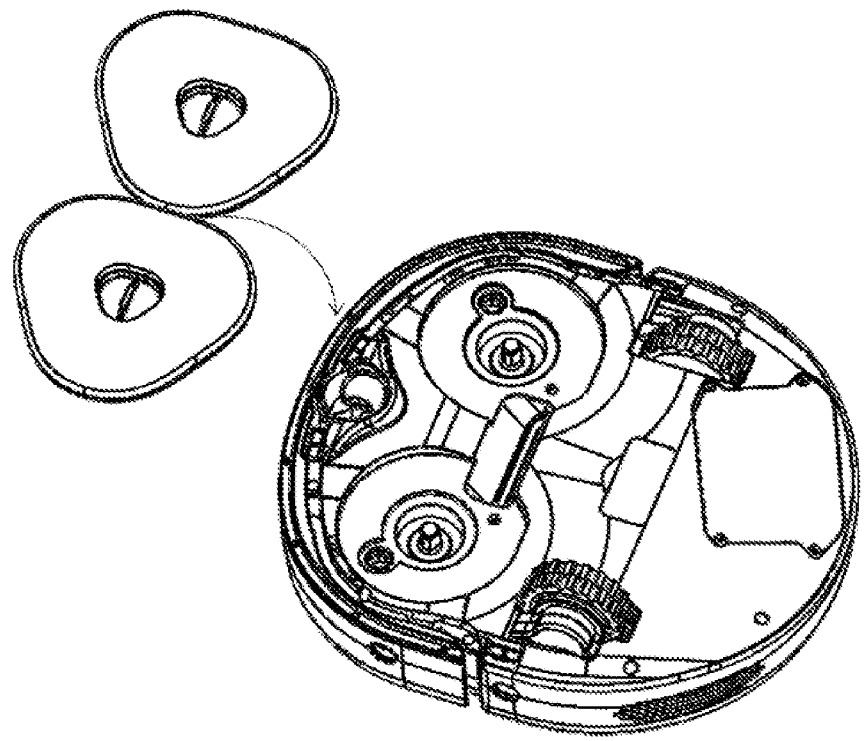
FIG. 13 is a schematic process diagram of installing the mopping module on the robot body according to an embodiment of this application.
Figure 14:
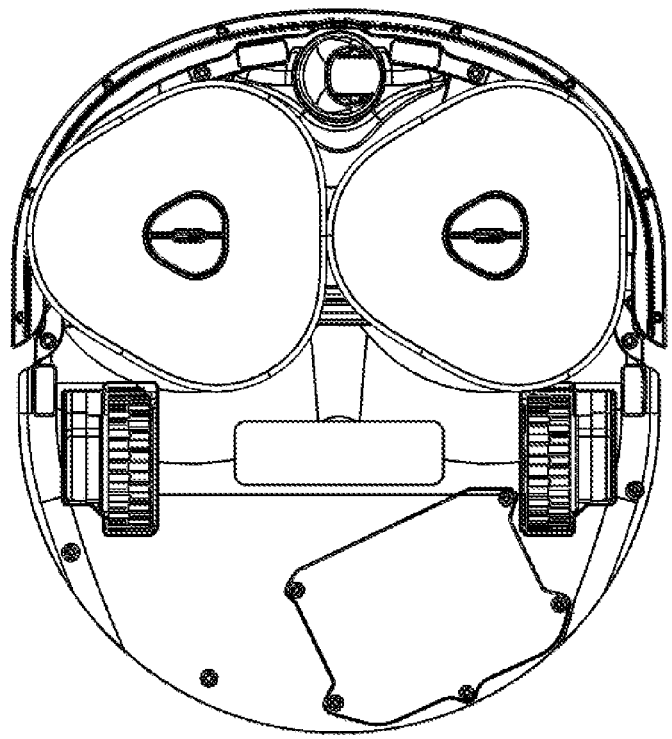
FIG. 14 is a bottom view of the robot body after the mopping module is installed according to an embodiment of this application.

There can be a variety of ways for the cleaning robot to detect the mopping module. When a magnetic member is provided on the turntable, at this time, the step of detecting the cleaning module is installed on the robot body includes: detecting a magnetic signal generated by the magnetic member of the turntable at a second position of the robot body. For example, as shown in FIG. 12, a magnetic member 1203 is provided inside a shaft sleeve of the turntable 1202 of the mopping module. As shown in FIG. 13, the mopping module is installed on the robot body, specifically, the shaft sleeve of the turntable of the mopping module is sleeved on the rotating shaft at the bottom of the robot body, and the installation result is shown in FIG. 14. At this time, the shaft sleeve of the turntable of the mopping module is sleeved on the rotating shaft at the bottom of the robot body. Because the shaft sleeve of the turntable is provided with a magnet or other magnetic member, the turntable and the rotating shaft are magnetically connected, so that the connection between the mopping module and the robot body is stable. In addition, the rotating shaft of the robot body is a magnetically permeable material, and a second Hall sensor is provided close to the other end of the rotating shaft inside the robot body, when the rotating shaft is magnetically permeable by the magnet of the mopping module, the second Hall sensor generates a preset electrical signal, specifically from high level to low level. The cleaning robot determines that the mopping module is installed on the robot body when detecting the preset electrical signal generated by the second Hall sensor, thereby performing the mopping working mode, such as controlling the cleaning robot to move to the base station to clean the mopping module on the base station, so that the mopper of the mopping module is wet to facilitate the mopping operation. The magnetic member of the embodiment of the present application may be a permanent magnet or an electromagnet.

It should be understood that in the embodiments of the present application, if the robot body is connected to the mopping module and the sweeping module through at least one rotating shaft, the rotating shaft connected to the mopping module may be the same as or different from the rotating shaft connected to the sweeping module, and the embodiments of this application are not specifically limited.

In a specific embodiment, the cleaning mode control method of the embodiment of the present application can be applied to a scenario where the cleaning modules are replaceable. At this time, the cleaning module includes a first cleaning module and a second cleaning module.

The Step 602 of on condition of detecting the cleaning module is installed on the robot body, controlling the cleaning robot to perform a cleaning mode used in conjunction with the cleaning module, specifically includes:

Step A1: on condition of detecting the first cleaning module is installed on the robot body, controlling the cleaning robot to perform a first cleaning mode used in conjunction with the first cleaning module.

Specifically, one of the specific implementation manners of detecting the first cleaning module is installed on the robot body is: detecting a first signal at a first position of the robot body, where the first signal is generated by the first cleaning module.

Step A2: on condition of not detecting the first cleaning module is installed on the robot body, and detecting the second cleaning module is installed on the robot body, controlling the cleaning robot to perform a second cleaning mode used in conjunction with the second cleaning module. The first cleaning module and the second cleaning module are different parts for cleaning the ground, and the first cleaning mode and the second cleaning mode are different working modes for cleaning the ground.

Specifically, one of the specific implementation manners of not detecting the first cleaning module is installed on the robot body, and detecting the second cleaning module is installed on the robot body is: not detecting the first signal at the first position of the robot body, and detecting a second signal at a second position of the robot body, the second signal is generated by the second cleaning module.

In the specific implementation manners of Step A1 and Step A2, the first position and the second position are different positions, and/or, the first signal and the second signal are different types of signals.

Optionally, the first cleaning module is a sweeping module, the first cleaning mode is a sweeping working mode, the second cleaning module is a mopping module, and the second cleaning mode is a mopping working mode; or, the first cleaning module is the mopping module, the first cleaning mode is the mopping working mode, the second cleaning module is the sweeping module, and the second cleaning mode is the sweeping working mode; the sweeping module is configured for sweeping the ground, and the mopping module is configured for mopping the ground. In other words, after the sweeping module is installed on the robot body, the cleaning robot detects that the sweeping module is installed on the robot body, at this time, the cleaning robot performs the sweeping working mode. Then, the user removes the sweeping module from the robot body, and installs the mopping module on the robot body, the cleaning robot cannot detect the sweeping module on the robot body, but detects the mopping module, the cleaning robot performs the mopping working mode. Next time, the user removes the mopping module from the robot body and installs the sweeping module on the robot body. The cleaning robot cannot detect the mopping module on the robot body, but detects the sweeping module, the cleaning robot performs the sweeping working mode.

Regarding the sweeping module, the sweeping working mode, the mopping module, the mopping working mode, the detection of the sweeping module, and the detection of the mopping module can refer to the description of the embodiments shown in FIGS. 7 to 14 above, which will not be repeated here.

An example of Step A1 and Step A2 is, for example, the user installs the sweeping module shown in FIG. 8 on the robot body as shown in FIG. 10, and the installation result is shown in FIG. 11, at this time, the cleaning robot can sweep the ground through the sweeping module. When the installation state shown in FIG. 11 is completed, the metal member on the robot body and the magnet of the sweeping module are magnetically connected. The metal member is magnetically permeable, so that the first Hall sensor located near the metal member in the robot body changes from high level to low level, generating a low level signal. The processor in the cleaning robot acquires the low level signal of the first Hall sensor and determines that the sweeping module is installed on the robot body, thereby performing the sweeping working mode. For example, when the dust box is detected to be installed on the robot body, the fan on the robot body is turned on to sweep the ground. Then, the user removes the sweeping module from the robot body, and installs the mopping module shown in FIG. 12 on the robot body as shown in FIG. 13, and the installation result is shown in FIG. 14, at this time, the cleaning robot can mop the ground by the mopping module. When the installation state shown in FIG. 14 is completed, the turntable of the mopping module is sleeved on the rotating shaft on the cleaning robot, and the turntable of the mopping module and the rotating shaft on the cleaning robot are magnetically connected. The rotating shaft is magnetically permeable, so that the second Hall sensor located near the rotating shaft in the robot body detects the magnetic field, and the second sensor changes from high level to low level, generating a low level signal. The processor in the cleaning robot acquires the low level signal of the second Hall sensor and determines that the mopping module is installed on the robot body, thereby performing the mopping working mode. For example, controlling the cleaning robot to move to the base station to clean the mopping module on the base station. Later, the user can also remove the mopping module from the robot body and use the sweeping module to replace it. Alternatively, the user first installs the mopping module on the robot body, and then uses the sweeping module to replace it. The principle is the same as described above.

In summary, on the cleaning robot including the robot body, it is detected whether the cleaning module is installed on the robot body. On condition of detecting the cleaning module is installed on the robot body, controlling the cleaning robot to perform a cleaning mode used in conjunction with the cleaning module. The cleaning module is a component for cleaning a ground, and the cleaning mode is a working mode of the cleaning robot. In this way, when it is detected that the cleaning module is installed on the robot body, the cleaning mode performed by the cleaning robot is a cleaning mode used in conjunction with the cleaning module. Thus, the cleaning robot is automatically controlled to perform the cleaning mode corresponding to the cleaning module, so that the work of the cleaning robot is intelligent.

Figure 15:
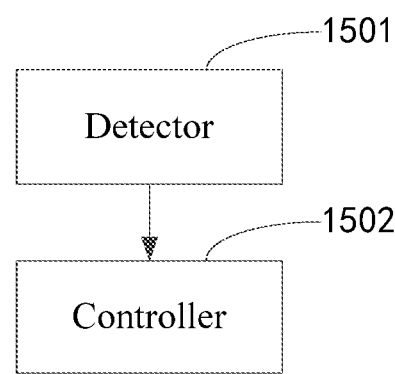
FIG. 15 is a schematic structural diagram of a cleaning robot according to an embodiment of this application.

The cleaning robot can be used to perform the cleaning mode control method of the embodiment shown in FIG. 6 above, and the cleaning robot shown in FIG. 15 can be integrated into the cleaning robot shown in FIG. 5.

Referring to FIG. 15, the cleaning robot according to an embodiment of this application includes a robot body; the cleaning robot further includes: a detector 1501 configured for detecting whether a cleaning module is installed on the robot body; and a controller 1502 configured for on condition of detecting the cleaning module is installed on the robot body, controlling the cleaning robot to perform a cleaning mode used in conjunction with the cleaning module; the cleaning module is a component for cleaning a ground, and the cleaning mode is a working mode of the cleaning robot.

Optionally, the cleaning module is a sweeping module; the cleaning mode is a sweeping working mode; and the sweeping module is configured for sweeping the ground.

Optionally, the sweeping working mode includes detecting whether a dust box is installed on the robot body, and/or turning on a fan on the robot body; the dust box is configured for receiving garbage sucked by the cleaning robot from the ground, and the fan is configured for providing negative pressure to the robot body to suck the garbage from the ground.

Optionally, the sweeping module includes a module body and a side brush, the side brush is connected to the module body and rotatable relative to the module body; the sweeping module is detachably connected to the robot body through the module body; and when the sweeping module is installed on the robot body, an output shaft on the robot body and the side brush are coaxially linked.

Optionally, the module body is provided with a magnetic member; and the controller 1502 is further configured for on condition of detecting a magnetic signal generated by the magnetic member on the module body at a first position of the robot body, controlling the cleaning robot to perform a cleaning mode used in conjunction with the cleaning module.

Optionally, the cleaning module is a mopping module; the cleaning mode is a mopping working mode; and the mopping module is configured for mopping the ground.

Optionally, the mopping working mode includes controlling the cleaning robot to move toward a base station to clean the mopping module on the base station.

Optionally, the mopping module includes a mopper and a turntable connected to each other, and the mopper is configured for wiping the ground;

the mopping module is detachably connected to the robot body through the turntable; and when the mopping module is installed on the robot body, the output shaft on the robot body and the turntable are coaxially linked.

Optionally, a magnetic member is provided on the turntable; and the controller 1502 is further configured for on condition of detecting a magnetic signal generated by the magnetic member on the turntable at a second position of the robot body, controlling the cleaning robot to perform a cleaning mode used in conjunction with the cleaning module.

Optionally, the cleaning module includes a first cleaning module and a second cleaning module; and the controller 1502 is further configured for on condition of detecting the first cleaning module is installed on the robot body, controlling the cleaning robot to perform a first cleaning mode used in conjunction with the first cleaning module; on condition of not detecting the first cleaning module is installed on the robot body, and detecting the second cleaning module is installed on the robot body, controlling the cleaning robot to perform a second cleaning mode used in conjunction with the second cleaning module; the first cleaning module and the second cleaning module are different parts for cleaning the ground, and the first cleaning mode and the second cleaning mode are different working modes for cleaning the ground.

Optionally, the controller 1502 is further configured for on condition of detecting the first signal at the first position of the robot body, controlling the cleaning robot to perform the first cleaning mode used in conjunction with the first cleaning module; on condition of not detecting the first signal at the first position of the robot body, and detecting the second signal at the second position of the robot body, controlling the cleaning robot to perform the second cleaning mode used in conjunction with the second cleaning module; the first signal is generated by the first cleaning module, and the second signal is generated by the second cleaning module; the first position and the second position are different positions, and/or, the first signal and the second signal are different types of signals.

Optionally, the first cleaning module is a sweeping module, the first cleaning mode is a sweeping working mode, the second cleaning module is a mopping module, and the second cleaning mode is a mopping working mode; or, the first cleaning module is a mopping module, the first cleaning mode is a mopping working mode, the second cleaning module is a sweeping module, and the second cleaning mode is a sweeping working mode; the sweeping module is configured for sweeping the ground, and the mopping module is configured for mopping the ground.

In summary, the detector 1501 is configured for detecting whether the cleaning module is installed on the robot body; on condition of detecting the cleaning module is installed on the robot body, the controller 1502 is configured for controlling the cleaning robot to perform a cleaning mode used in conjunction with the cleaning module; the cleaning module is a component for cleaning the ground, and the cleaning mode is a working mode of the cleaning robot. Thus, the cleaning robot is automatically controlled to perform the cleaning mode corresponding to the cleaning module, so that the work of the cleaning robot is intelligent.

Figure 7:
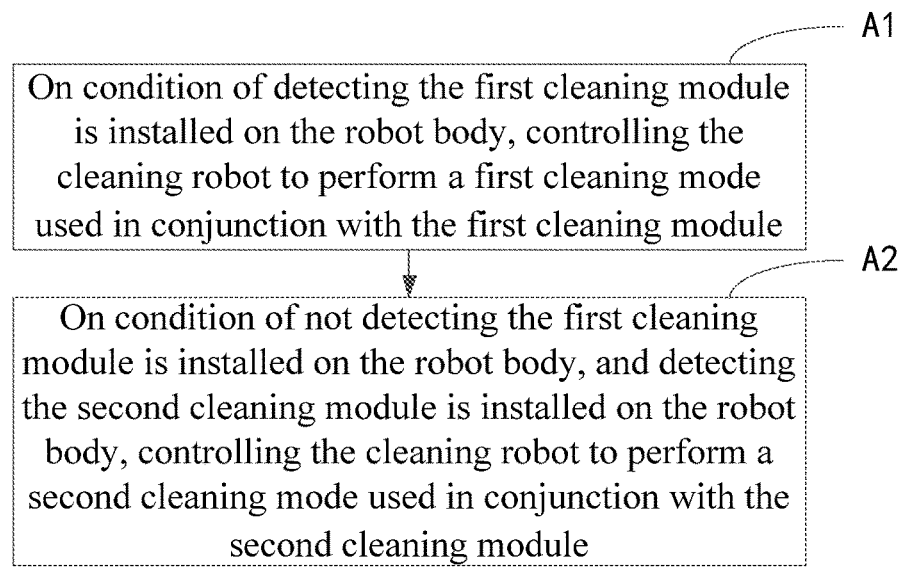
FIG. 7 is a flow chart of the cleaning mode control method according to another embodiment of this application.

Some embodiments of this application further provide a cleaning robot, which includes a memory and a processor; and at least one instruction is stored in the memory and loaded and performed by the processor to implement the cleaning mode control method shown in FIGS. 6 and 7.

The above embodiments may be implemented in whole or in part by software, hardware, firmware, or any combination thereof. When implemented by software, it may be implemented in whole or in part in the form of a computer program product.

The computer program product includes one or more computer instructions. When the computer program instruction is loaded and performed on the computer, the processes or functions described in the embodiments of this application are generated in whole or in part. The computer may be a general purpose computer, a dedicated computer, a computer network, or other programmable device. The computer instructions may be stored in a computer-readable storage medium, or transmitted from one computer-readable storage medium to another computer-readable storage medium, for example, the computer instructions may be transmitted from a website, a computer, a server or a data center to another website, computer, server or data center by wired means (such as coaxial cable, optical fiber, Digital Subscriber Line (DSL)) or wireless means (such as infrared, wireless, microwave). The computer readable storage medium may be any available medium that the computer can store or a data storage device containing one or more available medium integration, such as a server, data center, etc. The available medium may be a magnetic medium (such as floppy disk, hard disk, tape), optical medium (such as DVD), or semiconductor medium (such as Solid State Disk(SSD)).

Those skilled in the field can clearly understand that for the convenience and simplicity of the description, the specific working process of the systems, devices and units described above, reference may be made to the corresponding process in the foregoing method embodiment, which is not described herein again.

In several embodiments provided by the present application, it should be understood that the disclosed system, apparatus and method can be implemented in other ways. For example, the device embodiments described above are only indicative, for example, the division of the unit is only a logical function division, and there can be another division method in actual implementation, for example, multiple units or components can be combined or can be integrated into another system, or some features can be ignored or not performed. On the other hand, the coupling or direct coupling or communication connection between each other shown or discussed can be indirect coupling or communication connection of some interface, device or unit, which can be electrical, mechanical or other forms.

The unit described as a separate component may or may not be physically separate, and the component displayed as a unit may or may not be a physical unit, that is, may be located in one place, or it can be distributed to multiple network units. Some or all of the units can be selected according to actual needs to achieve the object of the embodiment of this application.

In addition, each functional unit in each embodiment of this application can be integrated in a processing unit, or each unit can exist separately, two or more units can also be integrated in one unit. The above integrated units can be implemented in the form of hardware or in the form of software functional units.

If the integrated unit is implemented in the form of a software functional unit and sold or used as an independent product, it can be stored in a computer readable storage medium. Based on such an understanding, the technical solution of this application essentially or part of the contribution to the existing technology or all or part of the technical solution can be embodied in the form of a software product, the computer software product is stored in a storage medium, including several instructions to make a computer device (which may be a personal computer, a server, or a network device, etc.) execute all or part of the steps of the methods described in the embodiments of this application. The aforementioned storage medium includes: U disk, mobile hard disk, ROM (Read-Only Memory), RAM (Random Access Memory), magnetic disk or optical disk and other medium that can store program codes.

As mentioned above, it should be noted that the above embodiments are only used to illustrate the technical solutions of the present application, but not to limit them. Although the present application has been described in detail with reference to the foregoing embodiments, those of ordinary skill in the art should understand that: the technical solutions described in the foregoing embodiments may still be modified, or some of the technical features thereof may be equivalently replaced; and these modifications or replacements do not deviate the essence of the corresponding technical solutions from the scope of the embodiments of the present application.

What is claimed is:

1. A cleaning mode control method applied to a cleaning robot comprising a robot body, wherein the method comprises:
   detecting whether a cleaning module is installed on the robot body;
   on condition of detecting that a first cleaning module is installed on the robot body, controlling the cleaning robot to perform a first cleaning mode used in conjunction with the first cleaning module; and
   on condition of not detecting the first cleaning module is installed on the robot body, and detecting a second cleaning module is installed on the robot body, controlling the cleaning robot to perform a second cleaning mode used in conjunction with the second cleaning module;
   wherein, the first cleaning module and the second cleaning module are different parts for cleaning a ground, and the first cleaning mode and the second cleaning mode are different working modes for cleaning the ground,
   the first cleaning module is provided with a first magnetic member, the robot body is provided with a first Hall sensor corresponding to the first magnetic member at a first position, the first Hall sensor is configured to sense a magnetic field of the first magnetic member to generate a first preset electrical signal when the first cleaning module is installed on the robot body, and
   the second cleaning module is provided with a second magnetic member, the robot body is provided with a second Hall sensor corresponding to the second magnetic member at a second position, the second Hall sensor is configured to sense a magnetic field of the second magnetic member to generate a second preset electrical signal when the second cleaning module is installed on the robot body,
   wherein, on condition of detecting the first cleaning module is installed on the robot body, controlling the cleaning robot to perform a first cleaning mode used in conjunction with the first cleaning module comprises:
     on condition of detecting the first preset electrical signal generated by the first Hall sensor, determining that the first cleaning module is installed on the robot body, and controlling the cleaning robot to perform the first cleaning mode used in conjunction with the first cleaning module; and
   on condition of not detecting the first cleaning module is installed on the robot body, and detecting a second cleaning module is installed on the robot body, controlling the cleaning robot to perform a second cleaning mode used in conjunction with the second cleaning module comprises:
     on condition of not detecting the first preset electrical signal generated by the first Hall sensor, and detecting the second preset electrical signal generated by the second Hall sensor, determining that the second cleaning module is installed on the robot body, and controlling the cleaning robot to perform the second cleaning mode used in conjunction with the second cleaning module.

2. The method of claim 1, wherein,
   the first cleaning module is a sweeping module and the second cleaning module is a mopping module, the sweeping module comprises a module body and a side brush, the side brush is connected to the module body and rotatable relative to the module body, and the module body is provided with the first magnetic member, the sweeping module is detachably connected to the robot body through the module body, and an output shaft on the robot body and the side brush are coaxially linked when the sweeping module is installed on the robot body, the mopping module comprises a mopper and a turntable connected to each other, the mopper is configured for mopping the ground, and the turntable is provided with the second magnetic member, the mopping module is detachably connected to the robot body through the turntable, and an output shaft on the robot body and the turntable are coaxially linked when the mopping module is installed on the robot body, wherein on condition of detecting the first preset electrical signal generated by the first Hall sensor, determining that the first cleaning module is installed on the robot body, and controlling the cleaning robot to perform the first cleaning mode used in conjunction with the first cleaning module comprises:
- on condition of detecting the first preset electrical signal generated by the first Hall sensor, determining that the sweeping module is installed on the robot body, and controlling the cleaning robot to perform a sweeping working mode used in conjunction with the sweeping module; and on condition of not detecting the first preset electrical signal generated by the first Hall sensor, and detecting the second preset electrical signal generated by the second Hall sensor, determining that the second cleaning module is installed on the robot body, and controlling the cleaning robot to perform the second cleaning mode used in conjunction with the second cleaning module comprises:
- on condition of not detecting the first preset electrical signal generated by the first Hall sensor, and detecting the second preset electrical signal generated by the second Hall sensor, determining that the mopping module is installed on the robot body, and controlling the cleaning robot to perform a mopping working mode used in conjunction with the second cleaning module;

or, the first cleaning module is a mopping module and the second cleaning module is a sweeping module, the sweeping module comprises a module body and a side brush, the side brush is connected to the module body and rotatable relative to the module body, and the module body is provided with the second magnetic member, the sweeping module is detachably connected to the robot body through the module body, and an output shaft on the robot body and the side brush are coaxially linked when the sweeping module is installed on the robot body, the mopping module comprises a mopper and a turntable connected to each other, the mopper is configured for mopping the ground, and the turntable is provided with the first magnetic member, the mopping module is detachably connected to the robot body through the turntable, and an output shaft on the robot body and the turntable are coaxially linked when the mopping module is installed on the robot body, wherein on condition of detecting the first preset electrical signal generated by the first Hall sensor, determining that the first cleaning module is installed on the robot body, and controlling the cleaning robot to perform the first cleaning mode used in conjunction with the first cleaning module comprises:
- on condition of detecting the first preset electrical signal generated by the first Hall sensor, determining that the mopping module is installed on the robot body, and controlling the cleaning robot to perform a mopping working mode used in conjunction with the mopping module; and on condition of not detecting the first preset electrical signal generated by the first Hall sensor, and detecting the second preset electrical signal generated by the second Hall sensor, determining that the second cleaning module is installed on the robot body, and controlling the cleaning robot to perform the second cleaning mode used in conjunction with the second cleaning module comprises:
- on condition of not detecting the first preset electrical signal generated by the first Hall sensor, and detecting the second preset electrical signal generated by the second Hall sensor, determining that the sweeping module is installed on the robot body, and controlling the cleaning robot to perform a sweeping working mode used in conjunction with the second cleaning module.

3. The method of claim 2, wherein the turntable comprises a shaft sleeve, the second magnetic member is provided inside the shaft sleeve, the robot body is provided with a magnetic permeable rotating shaft, and the second Hall sensor is close to the rotating shaft, when the mopping module is installed on the robot body, the shaft sleeve of the turntable is sleeved on the rotating shaft on the robot body to generate a magnetic field, and the second Hall sensor is configured to sense a corresponding magnetic field to generate the second preset electrical signal, on condition of not detecting the first preset electrical signal generated by the first Hall sensor, and detecting the second preset electrical signal generated by the second Hall sensor, determining that the mopping module is installed on the robot body, and controlling the cleaning robot to perform a mopping working mode used in conjunction with the second cleaning module comprises:
- on condition of not detecting the first preset electrical signal generated by the first Hall sensor, and detecting the magnetic field generated by the second magnetic member inside the shaft sleeve by the second Hall sensor, determining that the mopping module is installed on the robot body, and controlling the cleaning robot to perform a mopping working mode used in conjunction with the second cleaning module.

4. The method of claim 3, wherein the sweeping working mode comprises detecting whether a dust box is installed on the robot body, and turning on a fan on the robot body in responding to that the dust box is detected to be installed on the robot body;
the dust box is configured for receiving garbage sucked by the cleaning robot from the ground, and the fan is configured for providing negative pressure to the robot body to suck the garbage from the ground.

5. The method of claim 4, wherein the mopping working mode comprises controlling the cleaning robot to move toward a base station to clean the mopping module on the base station.

6. A cleaning robot comprising a robot body, wherein the cleaning robot further comprises:

a detector configured for detecting whether a cleaning module is installed on the robot body; and a controller configured for:
on condition of detecting that a first cleaning module is installed on the robot body, controlling the cleaning robot to perform a first cleaning mode used in conjunction with the first cleaning module; and on condition of not detecting the first cleaning module is installed on the robot body, and detecting a second cleaning module is installed on the robot body, controlling the cleaning robot to perform a second cleaning mode used in conjunction with the second cleaning module;

wherein, the first cleaning module and the second cleaning module are different parts for cleaning the ground, and the first cleaning mode and the second cleaning mode are different working modes for cleaning the ground, the first cleaning module is provided with a first magnetic member, the robot body is provided with a first Hall sensor corresponding to the first magnetic member at a first position, the first Hall sensor is configured to sense a magnetic field of the first magnetic member to generate a first preset electrical signal when the first cleaning module is installed on the robot body, the second cleaning module is provided with a second magnetic member, the robot body is provided with a second Hall sensor corresponding to the second magnetic member at a second position, the second Hall sensor is configured to sense a magnetic field of the second magnetic member to generate a second preset electrical signal when the second cleaning module is installed on the robot body, on condition of detecting the first preset electrical signal generated by the first Hall sensor, the controller is configured for determining that the first cleaning module is installed on the robot body, and controlling the cleaning robot to perform the first cleaning mode used in conjunction with the first cleaning module; and on condition of not detecting the first preset electrical signal generated by the first Hall sensor, and detecting the second preset electrical signal generated by the second Hall sensor, the controller is configured for determining that the second cleaning module is installed on the robot body, and controlling the cleaning robot to perform the second cleaning mode used in conjunction with the second cleaning module.

7. The cleaning robot of claim 6, wherein the first cleaning module is a sweeping module and the second cleaning module is a mopping module, the sweeping module comprises a module body and a side brush, the side brush is connected to the module body and rotatable relative to the module body, and the module body is provided with the first magnetic member, the sweeping module is detachably connected to the robot body through the module body, and an output shaft on the robot body and the side brush are coaxially linked when the sweeping module is installed on the robot body, the mopping module comprises a mopper and a turntable connected to each other, the mopper is configured for mopping the ground, and the turntable is provided with the second magnetic member, the mopping module is detachably connected to the robot body through the turntable, and an output shaft on the robot body and the turntable are coaxially linked when the mopping module is installed on the robot body, on condition of detecting the first preset electrical signal generated by the first Hall sensor, the controller is configured for determining that the sweeping module is installed on the robot body, and controlling the cleaning robot to perform a sweeping working mode used in conjunction with the sweeping module; and on condition of not detecting the first preset electrical signal generated by the first Hall sensor, and detecting the second preset electrical signal generated by the second Hall sensor, the controller is configured for determining that the mopping module is installed on the robot body, and controlling the cleaning robot to perform a mopping working mode used in conjunction with the second cleaning module;

or, the first cleaning module is a mopping module and the second cleaning module is a sweeping module, the sweeping module comprises a module body and a side brush, the side brush is connected to the module body and rotatable relative to the module body, and the module body is provided with the second magnetic member, the sweeping module is detachably connected to the robot body through the module body, and an output shaft on the robot body and the side brush are coaxially linked when the sweeping module is installed on the robot body, the mopping module comprises a mopper and a turntable connected to each other, the mopper is configured for mopping the ground, and the turntable is provided with the first magnetic member, the mopping module is detachably connected to the robot body through the turntable, and an output shaft on the robot body and the turntable are coaxially linked when the mopping module is installed on the robot body, on condition of detecting the first preset electrical signal generated by the first Hall sensor, the controller is configured for determining that the mopping module is installed on the robot body, and controlling the cleaning robot to perform a mopping working mode used in conjunction with the mopping module; and on condition of not detecting the first preset electrical signal generated by the first Hall sensor, and detecting the second preset electrical signal generated by the second Hall sensor, the controller is configured for determining that the sweeping module is installed on the robot body, and controlling the cleaning robot to perform a sweeping working mode used in conjunction with the second cleaning module.

8. The cleaning robot of claim 7, wherein the turntable comprises a shaft sleeve, the second magnetic member is provided inside the shaft sleeve, the robot body is provided with a magnetic permeable rotating shaft, and a sensor comprises the second Hall sensor close to the rotating shaft, when the mopping module is installed on the robot body, the shaft sleeve of the turntable is sleeved on the rotating shaft on the robot body to generate a magnetic field, and the second Hall sensor is configured to sense a corresponding magnetic field to generate the second preset electrical signal, on condition of not detecting the first preset electrical signal generated by the first Hall sensor, and detecting the magnetic field generated by the second magnetic member inside the shaft sleeve, the controller is configured for determining that the mopping module is installed on the robot body, and controlling the cleaning robot to perform a mopping working mode used in conjunction with the second cleaning module.

9. The cleaning robot of claim 8, wherein the sweeping working mode comprises detecting whether a dust box is installed on the robot body, and turning on a fan on the robot body in responding to that the dust box is detected to be installed on the robot body;

the dust box is configured for receiving garbage sucked by the cleaning robot from the ground, and the fan is configured for providing negative pressure to the robot body to suck the garbage from the ground.

10. The cleaning robot of claim 9, wherein the mopping working mode comprises controlling the cleaning robot to move toward a base station to clean the mopping module on the base station.

11. A non-transitory storage medium having at least one instruction stored thereon, wherein when the at least one instruction is executed by a processor, operations of a cleaning mode control method are executed:

detecting whether a cleaning module is installed on a robot body;

on condition of detecting that a first cleaning module is installed on the robot body, controlling the cleaning robot to perform a first cleaning mode used in conjunction with the first cleaning module; and on condition of not detecting the first cleaning module is installed on the robot body, and detecting a second cleaning module is installed on the robot body, controlling the cleaning robot to perform a second cleaning mode used in conjunction with the second cleaning module;

wherein, the first cleaning module and the second cleaning module are different parts for cleaning a ground, and the first cleaning mode and the second cleaning mode are different working modes for cleaning the ground, the first cleaning module is provided with a first magnetic member, the robot body is provided with a first Hall sensor corresponding to the first magnetic member at a first position, the first Hall sensor is configured to sense a magnetic field of the first magnetic member to generate a first preset electrical signal when the first cleaning module is installed on the robot body, and the second cleaning module is provided with a second magnetic member, the robot body is provided with a second Hall sensor corresponding to the second magnetic member at a second position, the second Hall sensor is configured to sense a magnetic field of the second magnetic member to generate a second preset electrical signal when the second cleaning module is installed on the robot body, wherein, on condition of detecting the first cleaning module is installed on the robot body, controlling the cleaning robot to perform a first cleaning mode used in conjunction with the first cleaning module comprises:

on condition of detecting the first preset electrical signal generated by the first Hall sensor, determining that the first cleaning module is installed on the robot body, and controlling the cleaning robot to perform the first cleaning mode used in conjunction with the first cleaning module; and on condition of not detecting the first cleaning module is installed on the robot body, and detecting a second cleaning module is installed on the robot body, controlling the cleaning robot to perform a second cleaning mode used in conjunction with the second cleaning module comprises:

on condition of not detecting the first preset electrical signal generated by the first Hall sensor, and detecting the second preset electrical signal generated by the second Hall sensor, determining that the second cleaning module is installed on the robot body, and controlling the cleaning robot to perform the second cleaning mode used in conjunction with the second cleaning module.

12. The non-transitory storage medium of claim 11, wherein, the first cleaning module is a sweeping module and the second cleaning module is a mopping module, the sweeping module comprises a module body and a side brush, the side brush is connected to the module body and rotatable relative to the module body, and the module body is provided with the first magnetic member, the sweeping module is detachably connected to the robot body through the module body, and an output shaft on the robot body and the side brush are coaxially linked when the sweeping module is installed on the robot body, the mopping module comprises a mopper and a turntable connected to each other, the mopper is configured for mopping the ground, and the turntable is provided with the second magnetic member, the mopping module is detachably connected to the robot body through the turntable, and an output shaft on the robot body and the turntable are coaxially linked when the mopping module is installed on the robot body, wherein on condition of detecting the first preset electrical signal generated by the first Hall sensor, determining that the first cleaning module is installed on the robot body, and controlling the cleaning robot to perform the first cleaning mode used in conjunction with the first cleaning module comprises:

on condition of detecting the first preset electrical signal generated by the first Hall sensor, determining that the sweeping module is installed on the robot body, and controlling the cleaning robot to perform a sweeping working mode used in conjunction with the sweeping module; and on condition of not detecting the first preset electrical signal generated by the first Hall sensor, and detecting the second preset electrical signal generated by the second Hall sensor, determining that the second cleaning module is installed on the robot body, and controlling the cleaning robot to perform the second cleaning mode used in conjunction with the second cleaning module comprises:

on condition of not detecting the first preset electrical signal generated by the first Hall sensor, and detecting the second preset electrical signal generated by the second Hall sensor, determining that the mopping module is installed on the robot body, and controlling the cleaning robot to perform a mopping working mode used in conjunction with the second cleaning module;

or, the first cleaning module is a mopping module and the second cleaning module is a sweeping module, the sweeping module comprises a module body and a side brush, the side brush is connected to the module body and rotatable relative to the module body, and the module body is provided with the second magnetic member, the sweeping module is detachably connected to the robot body through the module body, and an output shaft on the robot body and the side brush are coaxially linked when the sweeping module is installed on the robot body, the mopping module comprises a mopper and a turntable connected to each other, the mopper is configured for mopping the ground, and the turntable is provided with the first magnetic member, the mopping module is detachably connected to the robot body through the turntable, and an output shaft on the robot body and the turntable are coaxially linked when the mopping module is installed on the robot body, wherein on condition of detecting the first preset electrical signal generated by the first Hall sensor, determining that the first cleaning module is installed on the robot body, and controlling the cleaning robot to perform the first cleaning mode used in conjunction with the first cleaning module comprises:

on condition of detecting the first preset electrical signal generated by the first Hall sensor, determining that the mopping module is installed on the robot body, and controlling the cleaning robot to perform a mopping working mode used in conjunction with the mopping module; and on condition of not detecting the first preset electrical signal generated by the first Hall sensor, and detecting the second preset electrical signal generated by the second Hall sensor, determining that the second cleaning module is installed on the robot body, and controlling the cleaning robot to perform the second cleaning mode used in conjunction with the second cleaning module comprises:

on condition of not detecting the first preset electrical signal generated by the first Hall sensor, and detecting the second preset electrical signal generated by the second Hall sensor, determining that the sweeping module is installed on the robot body, and controlling the cleaning robot to perform a sweeping working mode used in conjunction with the second cleaning module.

13. The non-transitory storage medium of claim 12, wherein the turntable comprises a shaft sleeve, the second magnetic member is provided inside the shaft sleeve, the robot body is provided with a magnetic permeable rotating shaft, and the second Hall sensor is close to the rotating shaft, when the mopping module is installed on the robot body, the shaft sleeve of the turntable is sleeved on the rotating shaft on the robot body to generate a magnetic field, and the second Hall sensor is configured to sense a corresponding magnetic field to generate the second preset electrical signal, on condition of not detecting the first preset electrical signal generated by the first Hall sensor, and detecting the second preset electrical signal generated by the second Hall sensor, determining that the mopping module is installed on the robot body, and controlling the cleaning robot to perform a mopping working mode used in conjunction with the second cleaning module comprises:

on condition of not detecting the first preset electrical signal generated by the first Hall sensor, and detecting the magnetic field generated by the second magnetic member inside the shaft sleeve by the second Hall sensor, determining that the mopping module is installed on the robot body, and controlling the cleaning robot to perform a mopping working mode used in conjunction with the second cleaning module.

14. The non-transitory storage medium of claim 13, wherein the sweeping working mode comprises detecting whether a dust box is installed on the robot body, and turning on a fan on the robot body in responding to that the dust box is detected to be installed on the robot body;

the dust box is configured for receiving garbage sucked by the cleaning robot from the ground, and the fan is configured for providing negative pressure to the robot body to suck the garbage from the ground.

15. The non-transitory storage medium of claim 14, wherein the mopping working mode comprises controlling the cleaning robot to move toward a base station to clean the mopping module on the base station.

\* \* \* \* \*